United States Patent
Powell et al.

(10) Patent No.: US 8,978,481 B2
(45) Date of Patent: Mar. 17, 2015

(54) SIMULTANEOUS ULTRASONIC CROSS-CORRELATION AND TRANSIT TIME MEASUREMENTS FOR MULTIPHASE FLOW RATE ANALYSIS

(75) Inventors: Christopher J. Powell, Houston, TX (US); Rocco DiFoggio, Houston, TX (US); Datong Sun, Kingwood, TX (US); David M. Chace, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 719 days.

(21) Appl. No.: 13/227,289

(22) Filed: Sep. 7, 2011

(65) Prior Publication Data

US 2012/0063268 A1    Mar. 15, 2012

Related U.S. Application Data

(60) Provisional application No. 61/381,258, filed on Sep. 9, 2010.

(51) Int. Cl.
| | |
|---|---|
| *G01F 1/00* | (2006.01) |
| *G01F 1/74* | (2006.01) |
| *G01F 1/66* | (2006.01) |
| *E21B 47/10* | (2012.01) |

(52) U.S. Cl.
CPC *G01F 1/74* (2013.01); *G01F 1/662* (2013.01); *G01F 1/667* (2013.01); *E21B 47/101* (2013.01)

USPC .................................. 73/861.23; 73/861.27

(58) Field of Classification Search
CPC ........................... G01F 1/667; E21B 47/101
USPC ............... 367/89; 73/861.23, 861, 26, 861.27
See application file for complete search history.

(56) References Cited

U.S. PATENT DOCUMENTS

| | | | |
|---|---|---|---|
| 3,940,985 | A | 3/1976 | Wyler |
| 4,852,396 | A | 8/1989 | Tavlarides et al. |
| 5,633,470 | A | 5/1997 | Song |
| 6,732,595 | B2 | 5/2004 | Lynnworth |
| 7,380,438 | B2 | 6/2008 | Gysling et al. |
| 2003/0172743 | A1* | 9/2003 | Ao et al. ............. 73/861.27 |
| 2004/0011141 | A1* | 1/2004 | Lynnworth ........... 73/861.27 |
| 2007/0016058 | A1 | 1/2007 | Kerwin |
| 2009/0196120 | A1* | 8/2009 | Geerits ................ 367/35 |

* cited by examiner

*Primary Examiner* — Luke Ratcliffe
*Assistant Examiner* — Hovhannes Baghdasaryan
(74) *Attorney, Agent, or Firm* — Mossman Kumar & Tyler PC

(57) ABSTRACT

Pairs of acoustic transducers positioned at different radial distances in a conduit are used to measure travel times of acoustic signals in opposite directions and inclined to the direction of a fluid flow in the borehole. These contrapropagation measurements are used to estimate fluid velocity and volumetric flow rates of the fluid components in the conduit.

18 Claims, 8 Drawing Sheets

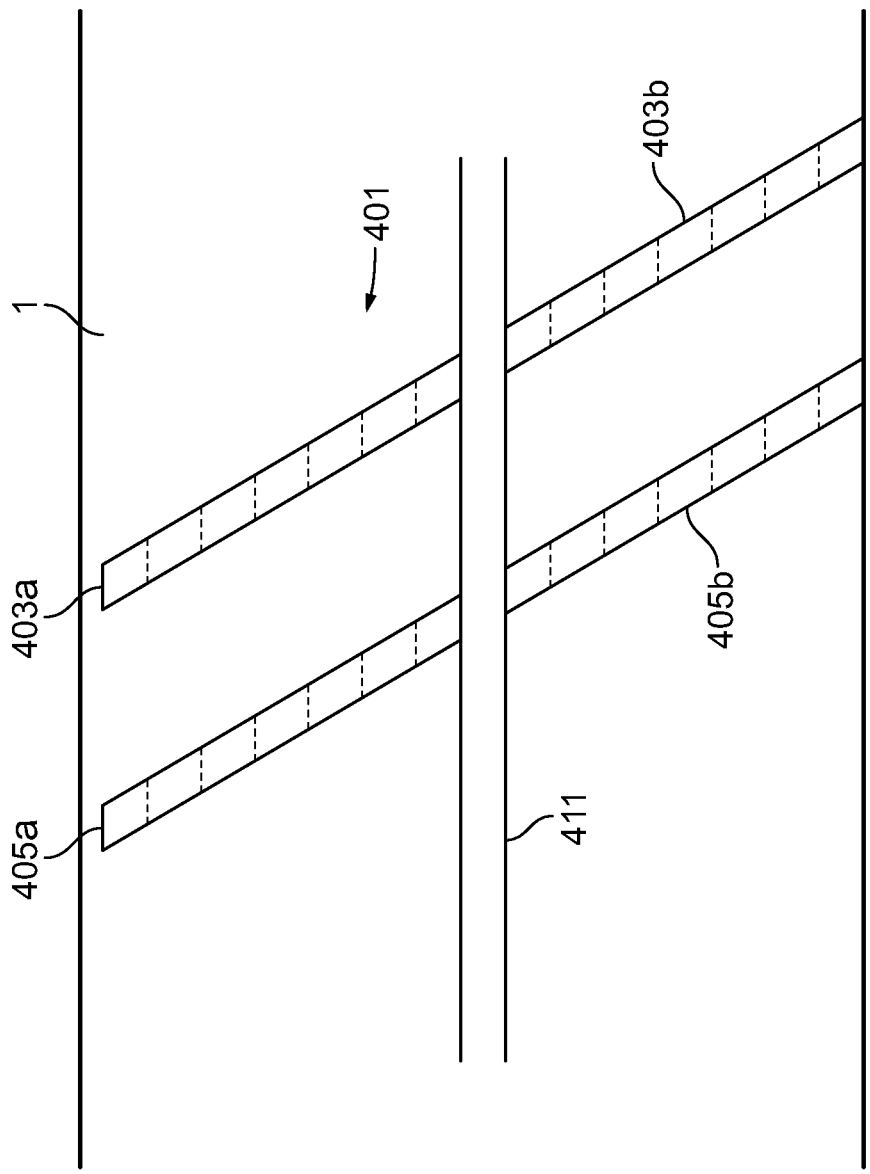

SIMULTANEOUS ULTRASONIC CROSS-CORRELATION AND TRANSIT TIME MEASUREMENTS FOR MULTIPHASE FLOW RATE ANALYSIS

CROSS-REFERENCES TO RELATED APPLICATIONS

This application claims priority from U.S. Provisional Patent Application Ser. No. 61/381,258, filed on 9 Sep. 2010, incorporated herein by reference in its entirety.

BACKGROUND OF THE DISCLOSURE

1. Field of the Disclosure

The present disclosure is related to the field of production logging of oil and gas wells. More specifically, the present disclosure is related to methods of determining volumetric flow rates of gas and liquid in highly inclined wellbores particularly when the flow regime substantially consists of stratified gas-liquid flow.

2. Description of the Related Art

Production logging of oil and gas wells is used to determine, with respect to depth, the flow rates of the various fluids flowing within the wellbore. Production logging includes lowering instruments into the wellbore at one end of an armored electrical cable. The instruments communicate signals along the cable to a recording system at the earth's surface wherein the instrument signals are converted into measurements corresponding to the flow rates of the fluids in the wellbore with respect to depth.

A particularly difficult flow condition to measure in highly inclined wellbores using the production logging tools known in the art is so-called stratified flow, in which the fluids in the wellbore comprise gas and liquid. Gas typically will occupy the upper portion of the wellbore, and the liquid will occupy the lower portion. In order for the wellbore operator to determine the volumetric flow rates of gas and liquid flowing in such a wellbore, the operator must be able to determine gas velocity, liquid velocity and the fractional amount of the wellbore cross-section occupied by each.

U.S. Pat. No. 5,633,470 to Song, having the same assignee as the present disclosure and the contents of which are incorporated herein by reference, teaches a method of determining volumetric flow rates of gas and liquid in an inclined conduit. The method includes measuring the velocity the gas, measuring the velocity of the liquid, calculating a fractional amount of the cross-sectional area of the conduit occupied by the gas and occupied by the liquid, and calculating the volumetric flow rates from the measurements of velocity and from the calculated fractional amounts of the cross-sectional area of the conduit occupied by the gas and by the liquid. In one embodiment, the gas velocity is measured by cross-correlating measurements of two spaced apart temperature sensors after momentarily heating the gas. In one embodiment, the liquid velocity is measured by a spinner flowmeter.

The present disclosure does not require the use of temperature sensors and furthermore eliminates the use of spinner flowmeters that can alter the flow velocity of a fluid. Furthermore, the robustness and novelty of the design relies on the combinatorial implementation of transit time (time of flight) and cross-correlation (finite eddy/impedance detection) using acoustic transducer pairs and pairs of pairs of acoustic transducers. Transit time (time of flight) measurements perform well in laminar flow conditions while the cross-correlation method complements the transit time method by excelling in mixed multiphase conditions.

SUMMARY OF THE DISCLOSURE

One embodiment of the disclosure includes an apparatus configured to estimate a volumetric flow rate of each fluid in a mixture of a plurality of fluids in a conduit, wherein the plurality of fluids have a stratified flow. The apparatus includes: a plurality of contrapropagation detectors arranged at a plurality of radial distances from a center of the conduit; and at least one processor configured to: use travel time measurements made by at least one of the contrapropagation detectors to estimate a velocity of flow of each of the fluids, and estimate the volumetric flow rate of each fluid using the estimated velocity of flow of each of the fluids.

Another embodiment of the disclosure includes a method of estimating a volumetric flow rate of each fluid in a mixture of a plurality of fluids in a conduit, wherein the plurality of fluids have a stratified flow. The method includes: using at least one of a plurality of contrapropagation detectors arranged at a plurality of radial distances from a center of the conduit for making a measurement of a travel time of an acoustic signal in opposite directions; and using at least one processor for: estimating a velocity of flow of each fluid using the travel time measurements made in opposite directions, and estimating the volumetric flow rate of each fluid using the estimated velocity of flow of each of the fluids.

Another embodiment of the disclosure includes a non-transitory computer-readable medium product having stored thereon instructions which when read by at least one processor cause the at least one processor to execute a method. The method includes: estimating a velocity of flow of each fluid in a mixture of fluids in stratified flow in a conduit using measurements made by a plurality of contrapropagation detectors arranged at a plurality of radial distances in the conduit; and estimating the volumetric flow rate of each fluid using the estimated velocity of flow of each of the fluids.

BRIEF DESCRIPTION OF THE DRAWINGS

The present disclosure is best understood with reference to the accompanying figures in which like numerals refer to like elements and in which:

FIG. 4A shows a side view of a sensor arrangement according to the present disclosure having anemometers disposed on four wings and forming a 3-D structure;

DETAILED DESCRIPTION OF THE DISCLOSURE

Figure 1:
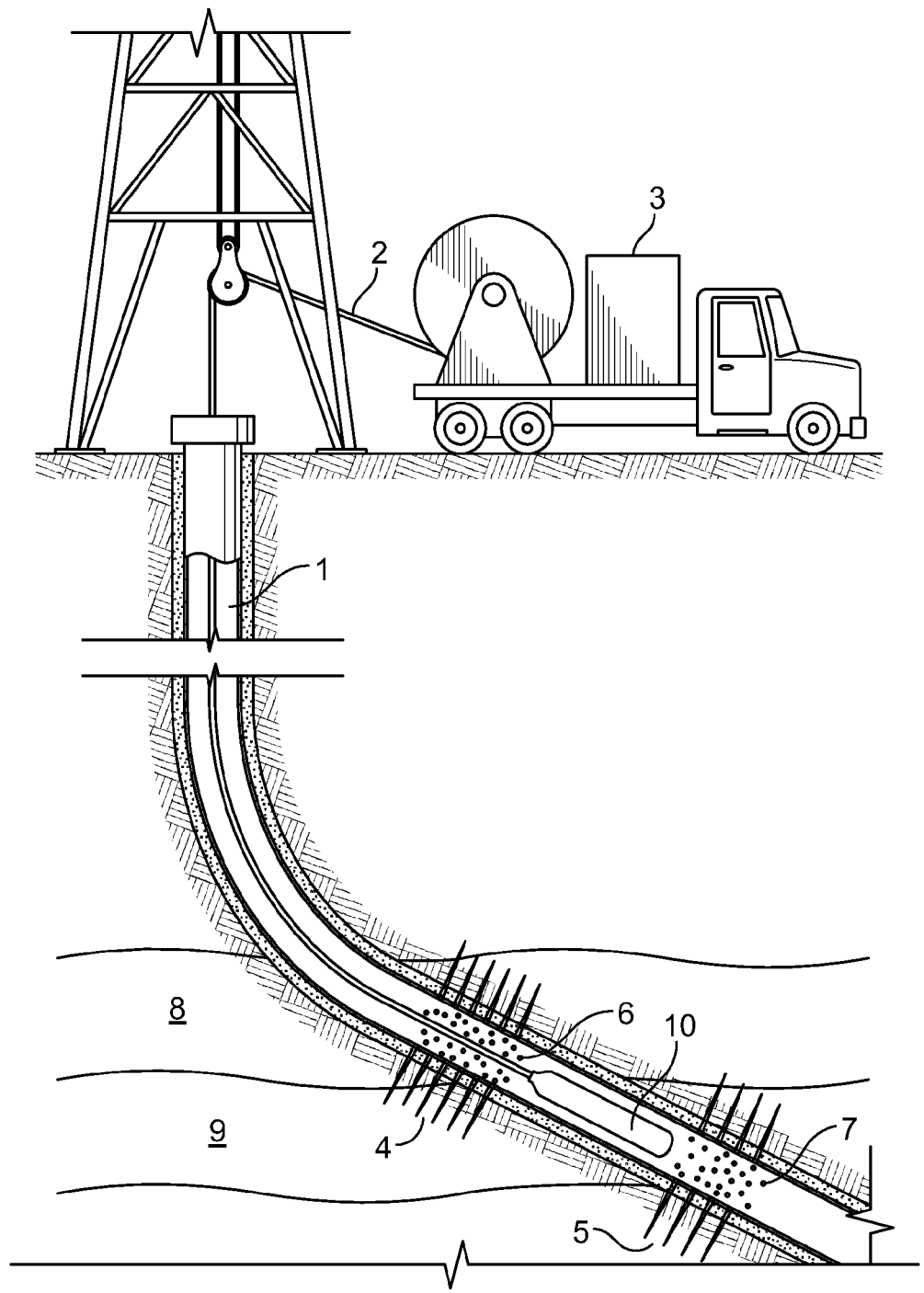
FIG. 1 shows a production logging tool some components of which have been modified according to the present disclosure being lowered into a wellbore.

FIG. 1 shows an electric wireline or cable 2 typically comprising at least one insulated electrical conductor (not shown separately) can be extended into a wellbore 1 by means of a surface logging unit 3 comprising a winch (not shown separately) or similar device known in the art. A logging tool 10 comprising an instrument for measuring gas velocity and liquid velocity (not shown separately in FIG. 1) can be attached to the end of the cable 2 which is extended into the wellbore 1. The logging unit 3 further comprises equipment (not shown separately) for sending electrical power to the tool 10, and receiving and interpreting signals transmitted along the cable 2 by the tool 10. The signals transmitted by the tool 10 correspond to, among other things, the gas velocity and liquid velocity. The use of the measurements of gas velocity and liquid velocity will be further explained.

A first zone 4 can be completed in an upper earth formation 8, and a second zone 5 can be completed in a lower earth formation 9. Each zone 4, 5 provides hydraulic communication between the respective earth formations 8, 9 and the wellbore 1. A first fluid 6 contained in the upper earth formation 8, and a second fluid 7 (which may be of different overall composition than the first fluid 6) contained in the lower earth formation 9, can flow into the wellbore 1. As the tool 10 is moved past the zones 4, 5, the tool 10 makes measurements corresponding to the relative volumes of the first 6 and second 7 fluids entering the wellbore 1 from the upper 8 and lower 9 earth formations respectively, as will be further explained. To use the present disclosure, the wellbore 1 typically may be inclined less than about ten degrees from horizontal at the depth at which the first formation 8 and the second formation 9 are located. It is to be understood that the particular arrangement shown in FIG. 1 is for illustrative purposes only, and the device and methods of the present disclosure can also be installed in a production wellbore. It should be further noted that the near horizontal inclination of the wellbore is not to be construed as a limitation.

Figure 2:
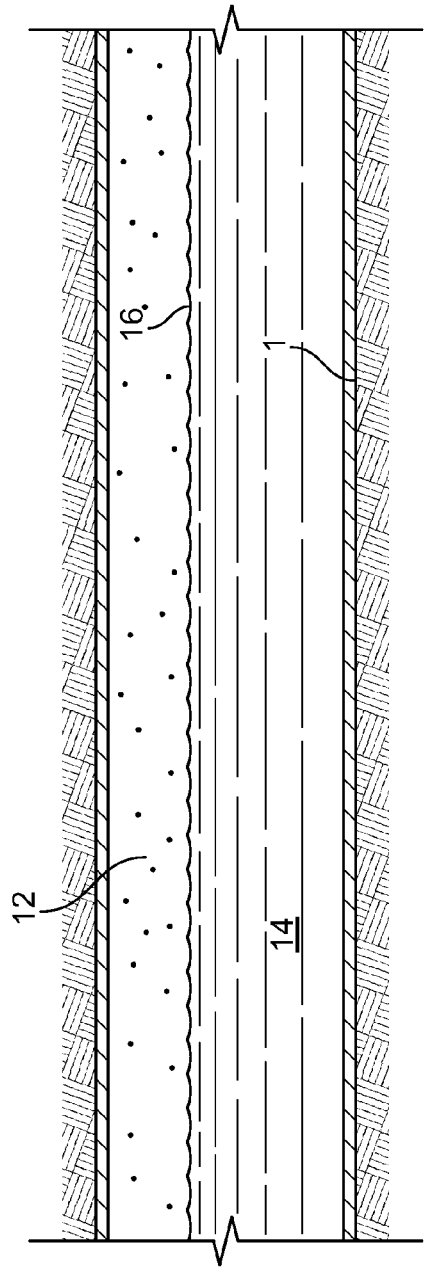
FIG. 2 shows stratified flow in the wellbore comprising liquid and gas segregated by gravity.

FIG. 2 shows a section of the wellbore 1 which is substantially horizontal. Gas 12 and liquid 14 are flowing in the section of the wellbore 1 in a manner referred to as stratified flow. The liquid 14 in FIG. 2 can be water, but it is to be understood that the present disclosure is also applicable when the liquid 14 comprises oil or mixtures of water and oil. Stratified flow typically occurs when the flowing velocity is low enough so as not to disturb substantially an interface 16 between the gas 12 and the liquid 14. The gas 12, being less dense than the liquid 14, segregates by gravity and tends to travel through the upper portion of the cross-sectional area of the wellbore 1. In the present disclosure, undetermined volumetric flow rates of gas and of liquid can enter the wellbore 1 from the first zone (shown as 4 in FIG. 1) and from the second zone (shown as 5 in FIG. 1). The volumetric flow rates at which the gas and liquid enter the wellbore 1 from each zone (4, 5) determine the overall velocity of the gas 12, the overall velocity of the liquid 14 and the fractional amount of the cross-section of the wellbore 1 which is occupied by the gas 12 and by the liquid 14.

As disclosed in U.S. Pat. No. 5,633,470 to Song having the same assignee as the present disclosure and the contents of which are incorporated herein by reference that assuming stratified flow, it is possible to determine the fractional amount of the cross-sectional area of the wellbore occupied by the gas 12 and the liquid 14 only by measuring gas 12 velocity and liquid 14 velocity. By determining the fractional amount of the cross-section and combining it with the velocity measurements, it is therefore possible to determine volumetric flow rates of the gas 12 and the liquid 14 only by measuring their respective velocities. It is to be understood that it is also possible to determine either the gas 12 velocity or the liquid 14 velocity by measuring the fractional amount of cross-section occupied by either one, and measuring the other velocity.

Figure 3:
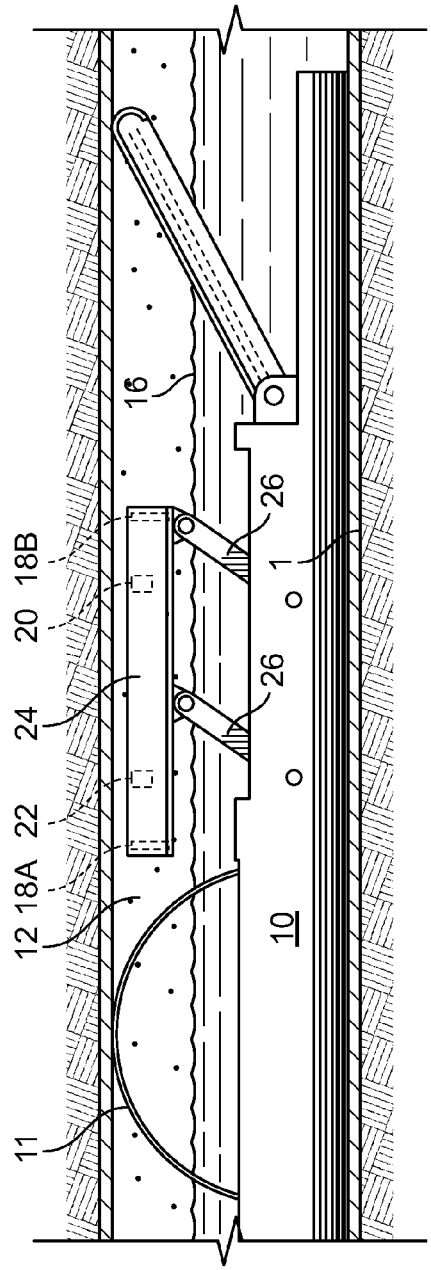
FIG. 3 shows a production logging tool that illustrates the use of wings.

Referring now to FIG. 3, a suitable sensor for determining the gas velocity is explained. The present disclosure includes a modification of this exemplary sensor. Hence, it is instructive to understand the functioning of the exemplary sensor.

A sensor housing 24 can be attached to the production logging tool 10 at the end of an extensible linkage 26. In the portion of the wellbore 1 which is substantially horizontal, as is understood by those skilled in the art, the tool 10 typically will be positioned along the bottom side of the wellbore 1 due to gravity. The tool 10 may be provided with a bowspring 11 or similar eccentering device so that the tool 10 is rotationally oriented to have the sensor housing 24 extend towards the top wall of the wellbore 1 when the linkage 26 is extended. The linkage 26 can be of a type familiar to those skilled in the art. The prior art sensor housing 24 includes two temperature sensors 20, 22 positioned at a predetermined spacing from each other along the housing 24. Heating elements, which can be electrical resistance type heaters, shown at 18A and 18B can be positioned at each end of the housing 24. The heating elements 18A and 18B can be periodically energized with pulses of electrical power generated by control circuits (not shown) in the tool 10. The gas 12 in contact with the element 18A, 18B will be slightly elevated in temperature when the power pulse is applied to element 18A, 18B. Depending on the gas 12 velocity, the heated gas 12 will travel so that it momentarily raises the temperature of one of the sensors 20 or 22, and then after a time delay raises the temperature momentarily of the other sensor 22 or 20. Two heating elements, 18A and 18B, are provided to allow for the possibility that the velocity of the tool 10 relative to the velocity of the gas 12 can cause the heated gas 12 to move in either direction relative to the two sensors 20, 22. The gas 12 velocity can be determined by measuring the time delay between the momentary temperature increases at one sensor 20 and then the other 22, and dividing the time delay into the predetermined distance between the sensors 20, 22. As is understood by those skilled in the art, determining the time delay may be performed by cross-correlating temperature measurements of the two sensors 20, 22 and determining a value of time delay at which the correlation value between measurements made by the two sensors reaches a maximum. As noted above, the present disclosure does not make use of temperature sensors.

Figure 4B:
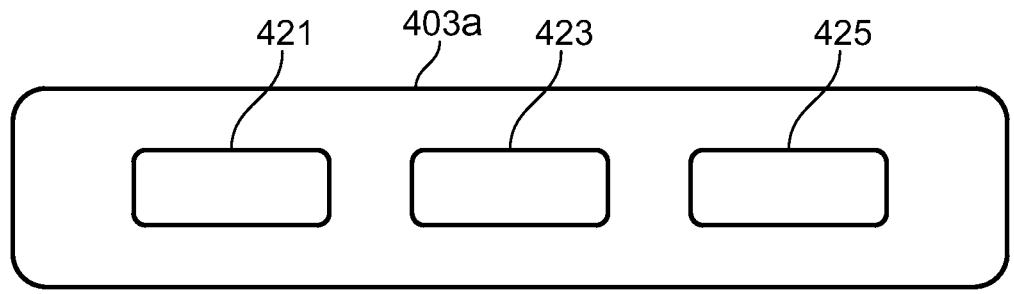
FIG. 4B shows a front view of one of the wings of FIG. 4A showing the openings in which acoustic transducers are positioned.

Turning now to FIG. 4A, a schematic longitudinal section of a tool according to the present disclosure is shown. The primary sensor package comprises a 2-dimensional array of acoustic anemometers 401 arranged along the inside surfaces of a pair of wings (rigid plates) 403a, 403b. The wings may be referred to as support members. These may be pivoted about the tool body 411 to enable the wings to extend outward to make contact with the wellbore wall 1. To simplify the illustration, the pivots and the mechanism for extending the wings outwards is now shown. As can be seen, the anemometers 401 are spaced at different radial distances from the center of the wellbore (conduit). A second pair of wings 405a, 405b axially spaced apart from first pair of wings 403a, 403b is provided. As can be seen, the wings are inclined to the longitudinal axis of the conduit. In the context of the present disclosure, an anemometer is defined as an instrument for measuring the speed of a fluid flow. FIG. 4B shows a front view of one of the wings of FIG. 4A with openings 421, 423, 425 in which acoustic transducers may be positioned.

Figure 4C:
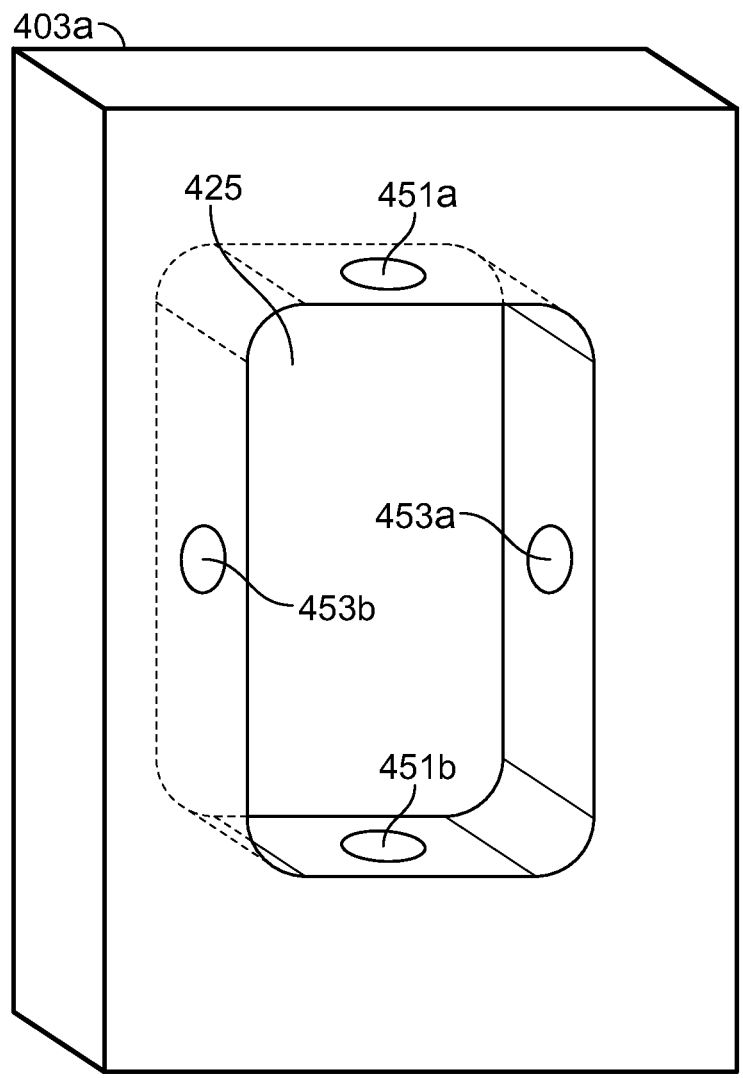
FIG. 4C shows the arrangement of transducers in an opening.

FIG. 4C shows the arrangement of acoustic transducers in an opening 425 of one of the wings 403a. At least one fluid from the mixture of plurality of fluids flows through the opening. A first pair of acoustic transducers 451a, 451b is referred to as a contrapropagation detector due to the fact that the acoustic path from transducer 451a to transducer 451b has a component against the direction of the fluid flow while the acoustic path from 451b to 451a has a component with the direction of fluid flow. As a result of the angle of the wing 403a, the transducer pair 451a and 451b are upstream and downstream relative to each other. "Pitch and catch" measurements are made between the transducers 451a, 451b. The theory behind the contrapropagation anemometer is straightforward. Sound waves traveling with fluid flow travel faster than sound waves moving against fluid flow. A simple analogy is that of a boat travels faster downstream than it does upstream. Accordingly, knowing the distance between the transducers 451a and 451b, the downstream travel time $t_d$ and the upstream travel time $t_u$ for an acoustic pulse between the transducers 451a and 451b, it is possible to estimate the component of the flow rate in the direction between 451a and 451b. Knowing the angle between the wing 403a and the axial direction of the conduit or wellbore 1, the flow rate along the wellbore can be estimated.

The path between transducers 453a and 453b does not have a component parallel to the fluid flow, so the transit time between the transducers 453a and 453b can be used to derive the velocity of compressional waves in the non-flowing fluid. Transducers 453a and 453b may be referred to as transverse transducers. Use of the transverse transducers is discussed further in an optional embodiment of the disclosure below.

Those versed in the art and having benefit of the present disclosure would recognize that transit time measurements of the type discussed above are particularly reliable in single-phase flow with a low flow rate. By single phase flow, it is meant that a continuous single fluid phase is present between a pair of acoustic transducers.

Figure 5:
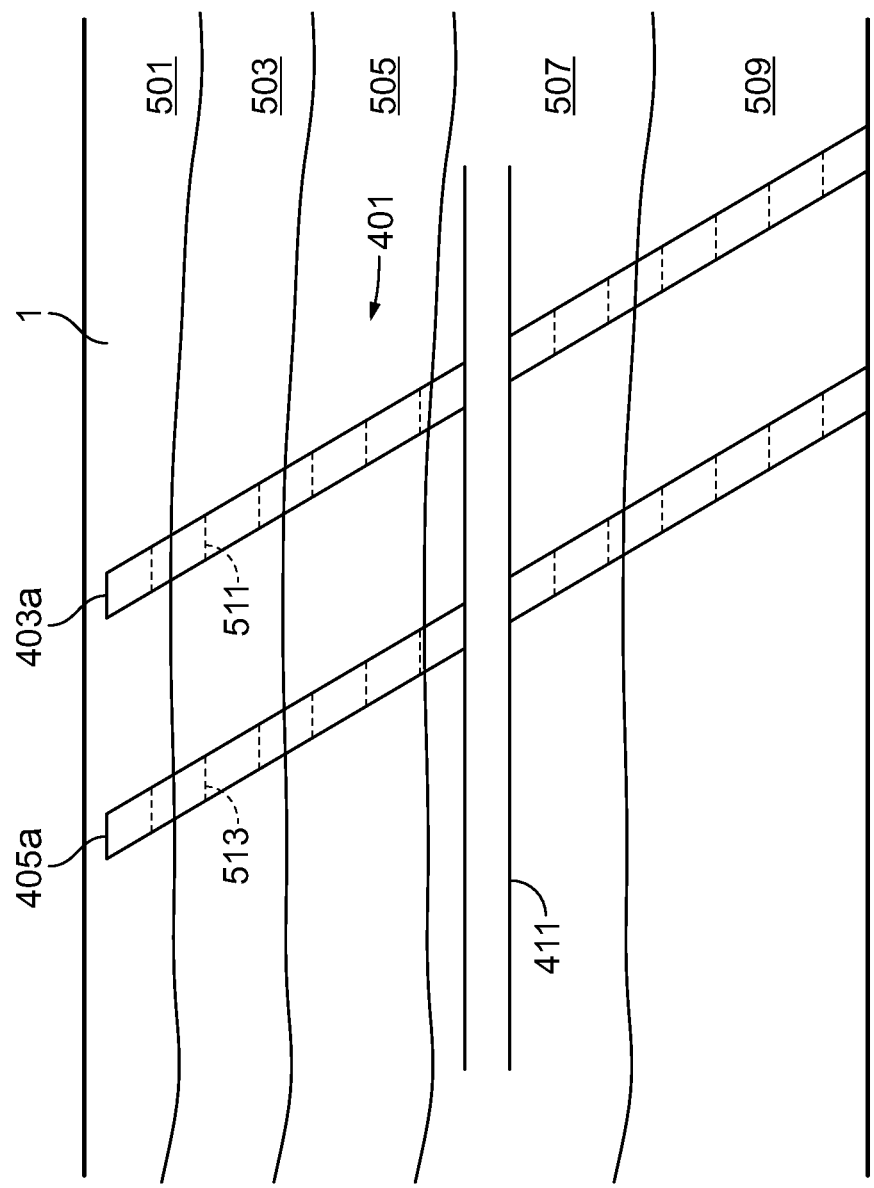
FIG. 5 shows an exemplary fluid flow regime that may be encountered by the sensor arrangement of FIG. 4A.

A typical example of a multiphase flow is shown in FIG. 5. In the most general case, there may be region 501 of gas flow, a region 503 of mixed gas and oil, a region 505 of oil, a region 507 of oil and water, and a region 509 of water. As can be seen, a single window such as 511 in wing 403a may have two different fluids (with different velocities) flowing within the window. Under such a condition, it is not clear what phase corresponds to a velocity measurement made by the contrapropagation anemometer. The present disclosure addresses this problem in one of two ways.

Figure 6:
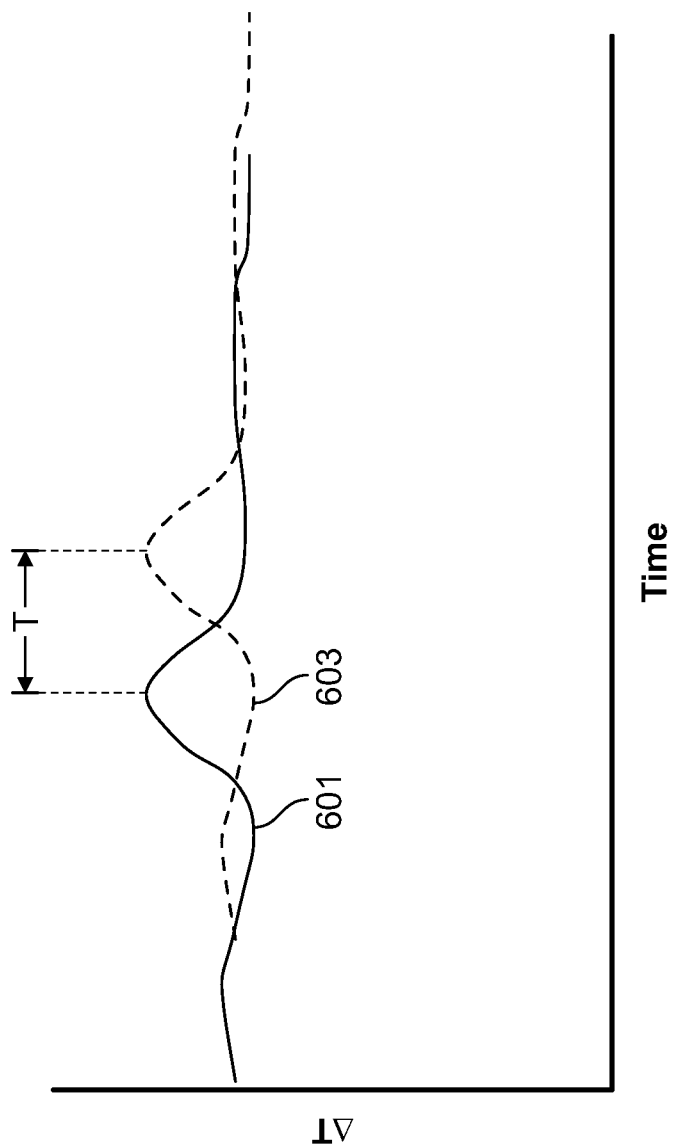
FIG. 6 shows a correlation method of estimating mixed phase flow.

In one embodiment of the disclosure, measurements made at corresponding windows of two wings are correlated. This is graphically illustrated in FIG. 6. Shown therein is a plot 601 of the time difference $\Delta T = t_u - t_d$ for the transducers 451a and 451b in window 511 of wing 403a and a plot 603 of the time difference $\Delta T = t_u - t_d$ for the corresponding contrapropagation transducers in window 513 of wing 405a. It is clear even to the naked eye that the two curves are separated by a time T based on the correlation of the two curves. This corresponds to the flow rate between window 511 and window 513. Accordingly, in one embodiment of the disclosure, the correlation is done by at least one processor and may be based on correlation of the measured ΔT. For the purposes of the present disclosure, it is to be noted that the wing 403a supports a first subset of the contrapropagation detectors and the wing 405a supports a second subset of the contrapropagation detectors. The peak in the time difference Δt may be associated with an eddy in the flow.

In an alternate embodiment of the disclosure, the measurement made between the transverse transducer pair 453a and 453b may be used. This transducer pair may detect changes in impedance or an eddy in the flow path. Correlating the measurements made by the transducer pair 453a and 453b with measurements made by a second pair of transverse transducers located downstream on wing 405a can give the flow rate.

Figure 7:
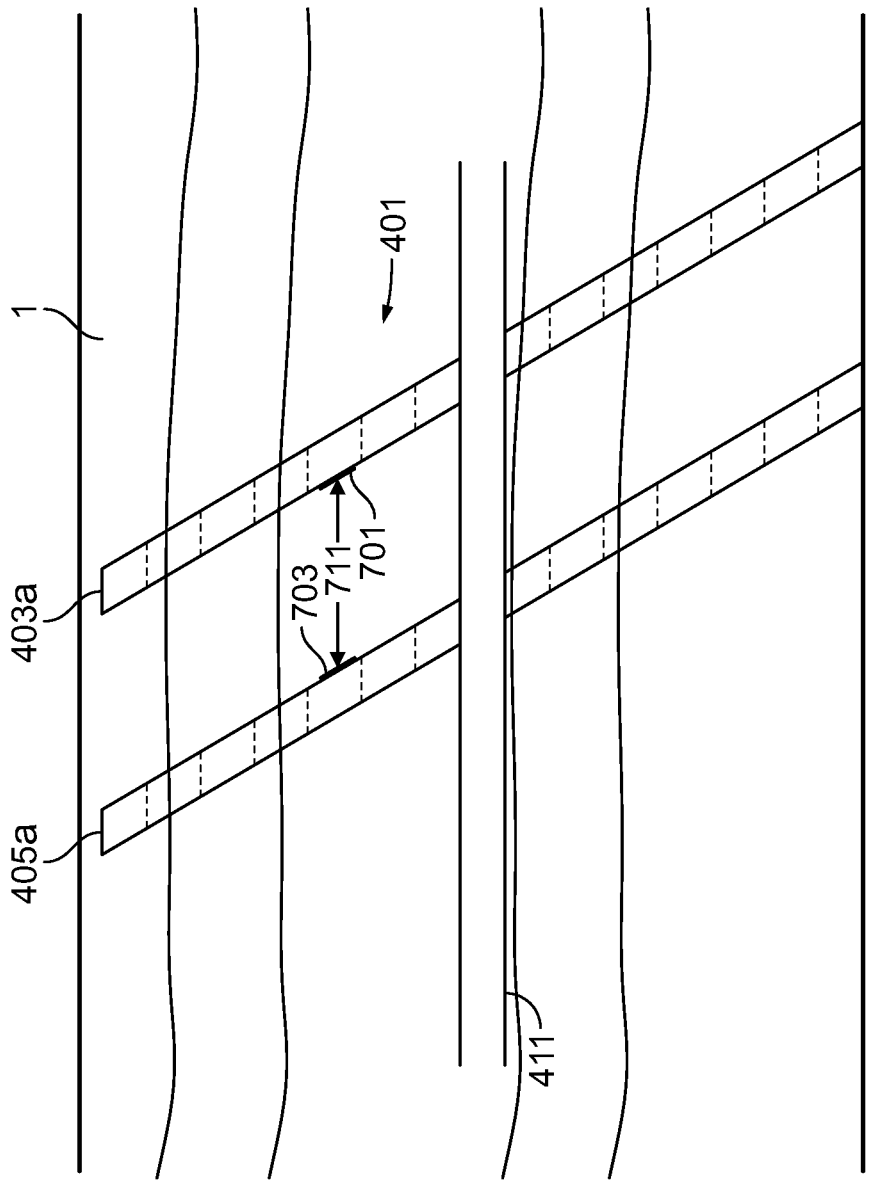
FIG. 7 shows an embodiment of the present disclosure in which signals are transmitted between transducers on two different wings.

In an another embodiment of the disclosure illustrated in FIG. 7, the contrapropagation measurements are made between the wings. This is illustrated in FIG. 7 by the additional acoustic transducers 701, 703 on the wings 403a, 405a and depicted by the raypath 711. Only one pair of transducers is shown to simplify the illustration, but a plurality of such transducer pairs placed along the wings can be used to make contrapropagation measurements along the entire width of the borehole 1 to give flow velocity measurements.

Figure 8:
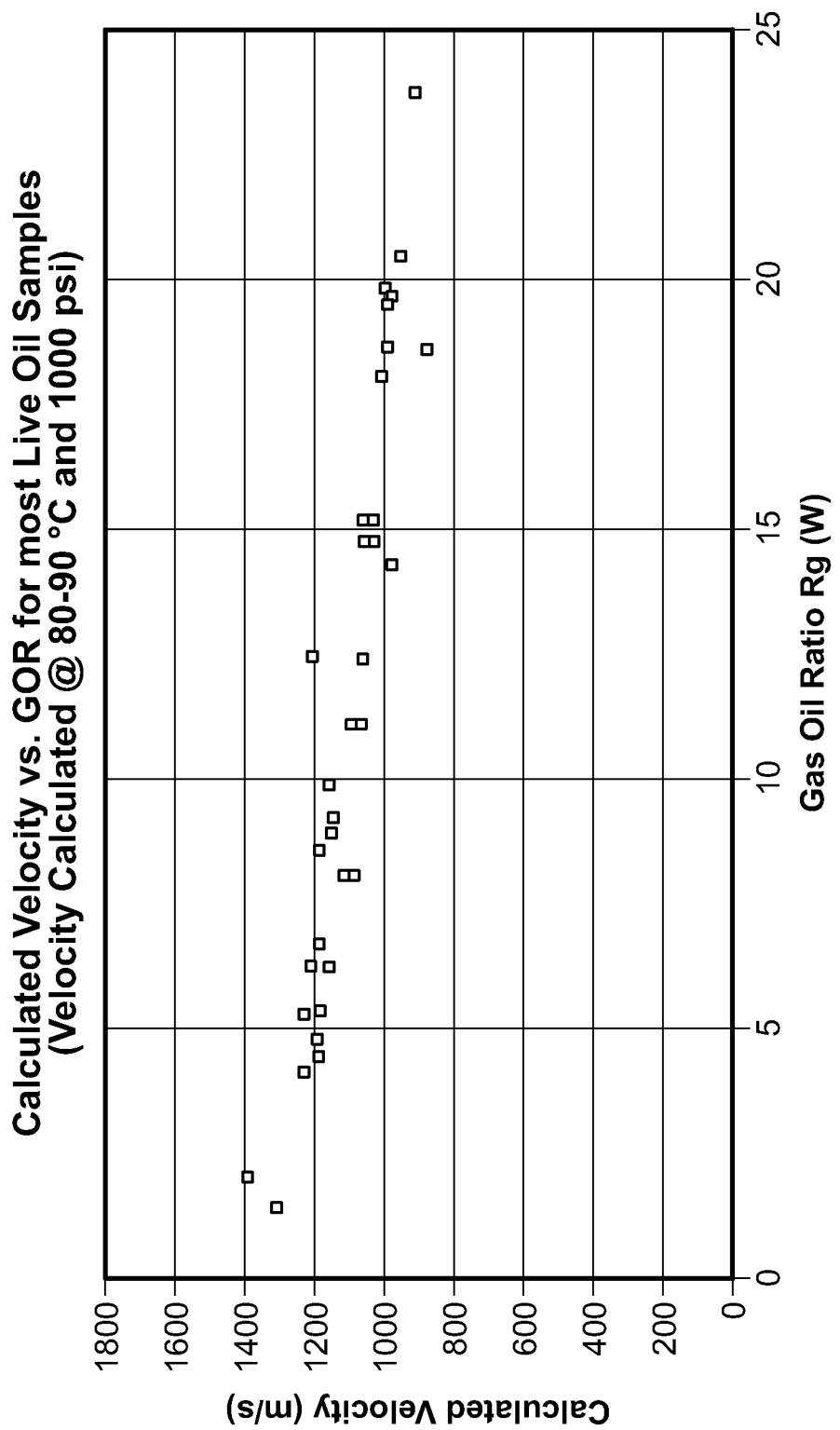
FIG. 8 shows the dependence of compressional wave velocity on the gas-oil ratio.

Returning now to the transverse detectors 453a, 453b, it is noted that these give a measurement of the compressional wave velocity of a single phase. In the particular case where the single phase comprises a gas-oil mixture, the measured velocity can be used to estimate the gas-oil ratio. Prior art measurements of the dependence of velocity on gas-oil-ratio (GOR) such as that in FIG. 8 can be used to estimate the GOR in addition to flow velocity and holdup. The estimation of GOR is an example of estimation of phase fraction: in this particular case, the fluids are gas and oil. Those versed in the art and having benefit of the present disclosure would recognize that the acoustic velocity measured by the transverse detectors is that of the fluid only and not affected by the flow velocity. Hence the velocity measurement made by the transverse detectors can be used with a table lookup to determine the fluid type. It should be further noted that the transit times measured by the contrapropagation detectors can also be used to estimate the velocity of compressional waves in the fluid.

The presence of gas bubbles in the flow can be detected by either the contrapropagation detectors or by the transverse detectors. The presence of gas bubbles is characterized by a severely attenuated signal or even an absent signal.

As noted above, once the fluid velocities have been estimated, it is possible to estimate the volumetric flow rates of the different components. In this regard, the velocity measurements made using the methods described above may be combined with those estimated using the method of Song i.e., capacitance and heating measurements, to give improved estimates of volumetric flow and holdup.

The disclosure above has been made with a particular configuration of contrapropagation and transverse acoustic detectors on wings that are in substantially the same plane. This is not to be construed as a limitation and other configurations may be used. Specifically, the transducers may be arranged in a three-dimensional arrangement without detracting from the principles outlined above.

The processing of the data may be accomplished by a downhole processor. Alternatively, measurements may be stored on a suitable memory device and processed upon retrieval of the memory device for detailed analysis. Implicit in the control and processing of the data is the use of a computer program on a suitable machine readable medium that enables the at least one processor to perform the control and processing. The machine readable medium may include ROMs, EPROMs, EAROMs, Flash Memories and Optical disks. All of these media have the capability of storing the data acquired by the logging tool and of storing the instructions for processing the data.

While the foregoing disclosure is directed to the specific embodiments of the disclosure, various modifications will be apparent to those skilled in the art. It is intended that all such variations within the scope of the appended claims be embraced by the foregoing disclosure.

What is claimed is:

1. An apparatus configured to estimate a volumetric flow rate of each fluid in a mixture of a plurality of fluids in a conduit, the plurality of fluids having a stratified flow, the apparatus comprising:
   a plurality of contrapropagation detectors arranged in the stratified flow at a plurality of radial distances from a center of the conduit; and
   a first support member configured to support a first subset of the plurality of contrapropagation detectors;
   the first subset comprising at least two detectors, and
   a second support member axially spaced apart from the first support member and configured to support a second subset of the plurality of contrapropagation detectors, the second subset comprising at least two detectors; and
   at least one processor configured to:
      use travel time measurements made by at least one of the contrapropagation detectors to estimate a velocity of flow of each of the fluids, and
      estimate the volumetric flow rate of each fluid using the estimated velocity of flow of each of the fluids.

2. The apparatus of claim 1 wherein each of the contrapropagation detectors is positioned in a window of a support member, the window being configured to allow flow of at least one fluid from the plurality of fluids therethrough.

3. The apparatus of claim 1 wherein each of the contrapropagation detectors further comprises a pair of acoustic transducers on opposite sides of the window.

4. The apparatus of claim 2 wherein the support member is inclined to a longitudinal axis of the conduit.

5. The apparatus of claim 1 wherein the at least one processor is further configured to estimate a velocity of flow of at least one of the plurality of fluids by correlating measurements made by one of the contrapropagation detectors on the first support member with measurements made by one of the contrapropagation detectors on the second support member.

6. The apparatus of claim 5 further comprising an additional contrapropagation detector comprising a first acoustic transducer on the first support member and a second acoustic transducer on the second support member, wherein the at least one processor is further configured to estimate a velocity of flow of at least one of the plurality of fluids using measurements made by the additional contrapropagation detector.

7. The apparatus of claim 2 further comprising a pair of transverse acoustic transducers positioned in the window of the support member configured to make a measurement of a compressional velocity of the at least one fluid in the window and wherein the at least one processor is further configured to estimate at least one of: (i) a phase fraction of the at least one fluid in the window using measurements made by the transverse acoustic detectors, (ii) a phase fraction of the at least one fluid in the window using measurements made by a pair of contrapropagation detectors, (iii) a type of the at least one fluid in the window using measurements made by the transverse acoustic detectors, (iv) a type of the at least one fluid in the window using measurements made by the pair of contrapropagation detectors, (v) a presence of gas bubbles in the window using measurements made by the transverse acoustic detectors, and (vi) a presence of gas bubbles in the window using measurements made by the pair of contrapropagation detectors.

8. A method of estimating a volumetric flow rate of each fluid in a mixture of a plurality of fluids in a conduit, the plurality of fluids having a stratified flow, the method comprising:
   using at least one of a plurality of contrapropagation detectors arranged in the stratified flow at a plurality of radial distances from a center of the conduit for making a measurement of a travel time of an acoustic signal in opposite directions,
   wherein the contrapropagation detectors arrangement comprises of a first support member configured to support a first subset of the plurality of contrapropagation detectors;
   the first subset comprising at least two detectors, and
   a second support member axially spaced apart from the first support member and configured to support a second subset of the plurality of contrapropagation detectors; and
   using at least one processor for:
      estimating a velocity of flow of each fluid using the travel time measurements made in opposite directions, and
      estimating the volumetric flow rate of each fluid using the estimated velocity of flow of each of the fluids.

9. The method of claim 8 further comprising:
   positioning each of the contrapropagation detectors in a window of a support member, the window configured to allow flow of at least one fluid of the plurality of fluids therethrough; and
   making the measurement of travel times on the fluid in the window.

10. The method of claim 8 further comprising using, for each of the contrapropagation detectors, a pair of acoustic transducers on opposite sides of the window.

11. The method of claim 9 further comprising positioning the support member at an inclination to a longitudinal axis of the conduit.

12. The method of claim 8 further comprising using a first support member to support a first subset of the plurality of contrapropagation detectors and a second support member axially spaced apart from the first support member to support a second subset of the plurality of contrapropagation detectors.

13. The method of claim 12 further comprising using the at least one processor for estimating a velocity of flow of at least one fluid of the plurality of fluids by correlating measurements made by a contrapropagation detector on the first support member with measurements made by a contrapropagation detector on the second support member.

14. The method of claim 12 further comprising using an additional contrapropagation detector comprising a first acoustic transducer on the first support member and a second acoustic transducer on the second support member, and using the at least one processor for estimating a velocity of flow of at least one fluid of the plurality of fluids using measurements made by the additional contrapropagation detector.

15. The method of claim 9 further comprising using a pair of transverse acoustic transducers positioned in the window of the support member for making a measurement of a compressional velocity of the at least one fluid in the window and using the at least one processor for estimating at least one of: (i) a phase fraction of the at least one fluid in the window from the measured compressional velocity using measurements made by the transverse acoustic detectors, (ii) a phase fraction of the at least one fluid in the window using measurements made by a pair of contrapropagation detectors, (iii) a type of the at least one fluid in the window using measurements made by the transverse acoustic detectors, (iv) a type of the at least one fluid in the window using measurements made by the pair of contrapropagation detectors, (v) a presence of gas bubbles in the window using measurements made by the transverse acoustic detectors, and (vi) a presence of gas bubbles in the window using measurements made by the pair of contrapropagation detectors.

16. A non-transitory computer-readable medium product having stored thereon instructions which when read by at least one processor cause the at least one processor to execute a method, the method comprising:
   estimating a velocity of flow of each fluid in a mixture of fluids in stratified flow in a conduit using measurements made by a plurality of contrapropagation detectors arranged in the stratified flow at a plurality of radial distances from a center of the conduit,
   wherein the contrapropagation detectors arrangement comprises of a first support member configured to support a first subset of the plurality of contrapropagation detectors;
   the first subset comprising at least two detectors, and
   a second support member axially spaced apart from the first support member and configured to support a second subset of the plurality of contrapropagation detectors,
   the second subset comprising at least two detectors;
   and estimating the volumetric flow rate of each fluid using the estimated velocity of flow of each of the fluids.

17. The non-transitory computer-readable medium product of claim 16 further comprising at least one of: (i) a ROM, (ii) an EPROM, (iii) an EAROM, (iv) a flash memory, and (v) an optical disk.

18. The apparatus of claim 1 wherein the travel time measurements are made by the plurality of contrapropagation detectors, and wherein the at least one processor is configured to correlate first travel time measurements from a first of the plurality of contrapropagation detectors with second travel time measurements from a second of the plurality of contrapropagation detectors to estimate the velocity of flow of each of the fluids.

* * * * *